US009267482B2

(12) United States Patent
Hansen et al.

(10) Patent No.: US 9,267,482 B2

(45) Date of Patent: Feb. 23, 2016

(54) STARTER SYSTEM FOR AN ENGINE

(71) Applicant: Briggs & Stratton Corporation, Wauwatosa, WI (US)

(72) Inventors: Jason A. Hansen, Elkhorn, WI (US); Robert Koenen, Pewaukee, WI (US); David W. Procknow, Elm Grove, WI (US); Stephen J. Lavender, Caledonia, WI (US); Jason D. Elvers, Horicon, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 14/507,247

(22) Filed: Oct. 6, 2014

(65) Prior Publication Data

US 2015/0053164 A1 Feb. 26, 2015

Related U.S. Application Data

(63) Continuation of application No. 13/692,739, filed on Dec. 3, 2012, now Pat. No. 8,857,138, which is a continuation-in-part of application No. 13/289,613, filed on Nov. 4, 2011, now Pat. No. 8,733,072.

(51) Int. Cl.
*A01D 34/76* (2006.01)
*F02N 11/08* (2006.01)
(Continued)

(52) U.S. Cl.
CPC .......... *F02N 11/0822* (2013.01); *A01D 34/006* (2013.01); *A01D 34/76* (2013.01);
(Continued)

(58) Field of Classification Search
CPC ... A01D 34/76; A01D 34/828; A01D 34/824; A01D 3/78; A01D 34/006; F02N 11/0822; F02N 11/087; F02N 11/08; F02N 11/0803; F02N 11/0862; F02N 11/0859; F02N 11/106; F02N 11/10; F02N 11/00; F02N 11/101; F02N 2200/044; F02N 2200/045; F02B 1/04; F04B 17/05; F04B 17/06; F02P 11/04
USPC ............ 56/10.5, 10.8, 11.1, 11.3, 11.7, 11.8, 56/10.2 R; 172/40–42; 180/6.62, 19.3, 180/315, 334, 6.34, 6.54–6.58, 273; 123/185.14, 179.5, 198 DC, 630; 318/430, 778, 783, 825; 417/234, 364
See application file for complete search history.

(56) References Cited

U.S. PATENT DOCUMENTS 3,536,051 A 10/1970 Hamman
3,569,726 A 3/1971 Reid et al.
(Continued)

FOREIGN PATENT DOCUMENTS

EP 2 332 768 6/2011
GB 2 442 345 4/2008
JP 2006-263628 10/2006

OTHER PUBLICATIONS

"Ryobi TouchStart Straight Shaft String Trimmer", http://www.youtube.com/watch?feature=endscreen&NR=1&v=qgpCdihrss0, uploaded to YouTube Apr. 27, 2011, 1 page.
(Continued)

*Primary Examiner* — Robert Pezzuto
(74) *Attorney, Agent, or Firm* — Foley & Lardner LLP

(57) ABSTRACT

An internal combustion engine includes a cylinder, an exhaust, a fuel tank, an engine cover, a power take off configured to drive an implement, an electric starting system including a starter motor, a battery receiving port, and a rechargeable battery removably attached to the battery receiving port, and an electric start control module including a switch configured to be actuated by a release mechanism configured to put the implement in the ready-to-run condition and a controller coupled to the switch, wherein the switch is configured to provide a signal when the release mechanism is in the engaged position, wherein the controller is configured to receive the signal, wherein the controller it configured to turn on the starter motor to start the internal combustion engine upon receipt of the signal from the switch and an input from a run sensor confirming that the implement is in the ready-to-run condition, and wherein the rechargeable battery is configured to power the starter motor to start the engine.

20 Claims, 10 Drawing Sheets

(51) Int. Cl.

*A01D 34/00* (2006.01)
*F04B 17/05* (2006.01)
*F04B 17/06* (2006.01)
*F02N 11/10* (2006.01)
*A01D 34/78* (2006.01)
*A01D 34/82* (2006.01)
*F02N 11/00* (2006.01)
*F04B 49/02* (2006.01)

(52) U.S. Cl.

CPC ............ *A01D 34/78* (2013.01); *A01D 34/824* (2013.01); *A01D 34/828* (2013.01); *F02N 11/00* (2013.01); *F02N 11/0803* (2013.01); *F02N 11/087* (2013.01); *F02N 11/101* (2013.01); *F04B 17/05* (2013.01); *F04B 17/06* (2013.01); *F02N 11/0848* (2013.01); *F04B 49/02* (2013.01)

(56) References Cited

U.S. PATENT DOCUMENTS 3,888,325 A 6/1975 Reinbeck
4,870,811 A 10/1989 Steele
4,882,896 A 11/1989 Wilcox
5,042,439 A 8/1991 Tholl et al.
5,085,043 A 2/1992 Hess et al.
5,186,142 A 2/1993 Brunelli et al.
5,208,525 A 5/1993 Lopic et al.
5,406,778 A 4/1995 Lamb et al.
5,442,901 A 8/1995 Niemela et al.
5,606,851 A 3/1997 Bruener et al.
5,784,868 A 7/1998 Wadzinski et al.
5,906,088 A 5/1999 Inui et al.
5,910,091 A 6/1999 Iida et al.
RE36,250 E 7/1999 Hess et al.
5,934,053 A 8/1999 Fillman et al.
5,937,623 A 8/1999 Wolf
6,077,186 A 6/2000 Kojima et al.
6,078,015 A 6/2000 Martinez
6,160,373 A 12/2000 Dunn et al.
6,220,005 B1 4/2001 Plamper et al.
6,230,678 B1 5/2001 Gracyalny et al.
6,260,529 B1 7/2001 Gracyalny et al.
6,263,852 B1 7/2001 Gracyalny et al.
6,311,663 B2 11/2001 Gracyalny et al.
6,325,036 B1 12/2001 Gracyalny et al.
6,386,169 B1 5/2002 Gracyalny et al.
6,404,078 B1 6/2002 Thomas et al.
6,464,052 B1 10/2002 Hsiao
6,523,334 B1 2/2003 Dettmann
6,571,542 B1 6/2003 Fillman et al.
6,595,176 B2 7/2003 Poehlman et al.
6,615,787 B2 9/2003 Gracyalny
6,622,683 B2 9/2003 Gracyalny et al.
6,647,942 B2 11/2003 Poehlman et al.
6,666,008 B2 12/2003 Iida et al.
6,751,936 B2 6/2004 Kucera et al.
6,758,030 B2 7/2004 Dettmann
6,826,895 B2 12/2004 Iida et al.
7,007,446 B2 3/2006 Dettmann
7,128,037 B2 10/2006 Tumback et al.
7,180,200 B2 2/2007 Walter et al.
7,309,928 B2 12/2007 Grant et al.
7,434,642 B2 10/2008 Dettmann
7,479,754 B2 1/2009 Lucas et al.
7,525,287 B2 4/2009 Miyashita et al.
7,540,132 B2 6/2009 Shimada et al.
7,677,017 B2 3/2010 Holby
7,687,926 B2 3/2010 Grant et al.
7,728,534 B2 6/2010 Lucas et al.
7,782,626 B2 8/2010 Buck et al.
7,989,969 B2 8/2011 Grant et al.
8,159,078 B2 4/2012 Usselman et al.
8,425,203 B2 4/2013 Gardner et al.
8,485,796 B2 7/2013 Gilpatrick
8,733,072 B2 5/2014 Hansen et al.
8,857,138 B2 10/2014 Hansen et al.
2004/0012204 A1 1/2004 Walter et al.
2004/0257038 A1 12/2004 Johnson et al.
2006/0027253 A1 2/2006 Kaiser
2006/0170218 A1 8/2006 Grant et al.
2006/0245941 A1 11/2006 Sharp
2007/0020592 A1 1/2007 Cornale
2007/0240892 A1 10/2007 Brotto et al.
2008/0079264 A1 4/2008 Serdynski et al.
2008/0120955 A1 5/2008 Lucas et al.
2008/0223012 A1 9/2008 Rosa et al.
2008/0231144 A1 9/2008 Grant et al.
2008/0289309 A1 11/2008 Gust et al.
2009/0064957 A1 3/2009 Grybush
2009/0223475 A1 9/2009 Wilson et al.
2009/0255502 A1 10/2009 Cook
2009/0278509 A1 11/2009 Boyles et al.
2009/0284022 A1 11/2009 Usselman et al.
2009/0295169 A1 12/2009 Usselman et al.
2011/0073189 A1 3/2011 Elbert et al.
2013/0092745 A1 4/2013 Karp
2013/0111864 A1 5/2013 Hansen et al.
2014/0230393 A1 8/2014 Hansen et al.
2014/0299089 A1 10/2014 Koenen et al.

OTHER PUBLICATIONS

"Ryobi® TouchStart", http://www.youtube.com/watch?v=BpyOxL9IG88&noredirect=1, uploaded to YouTube Feb. 24, 2010, 1 page.

"How to Start Ryobi Touch Start™ Petrol Line Trimmer and Brush Cutter," http://www.youtube.com/watch?v=tjAtHunBemM&feature=related, uploaded to YouTube Dec. 9, 2011, 1 page.

Briggs & Stratton Service and Repair Instructions for Single Cylinder 4-Cycle Engines, Section 7B, Electric Starter Systems, Jan. 1990, 8 pages.

International Search Report and Written Opinion regarding PCT/US2013/035623, mail date Sep. 10, 2013, 19 pages.

Machine Translation of JP2006263628A, dated Oct. 5, 2006, 4 pages.

Partial Search Report for International Application No. PCT/US2013/035623, mail date Jul. 10, 2013, 2 pages.

International Search Report and Written Opinion for PCT Application No. PCT/US2014/043232, dated Sep. 30, 2014, 9 pages.

Notice of Allowance, U.S. Appl. No. 14/260,206, 7 pages (Oct. 20, 2015).

Office Action, U.S. Appl. No. 14/822,700, 8 pages (Oct. 8, 2015).

U.S. Office Action, U.S. Appl. No. 13/913,326, 16 pages (Sep. 4, 2015).

U.S. Office Action, U.S. Appl. No. 14/260,206, 6 pages (Jun. 24, 2015).

STARTER SYSTEM FOR AN ENGINE

CROSS-REFERENCE TO RELATED PATENT APPLICATIONS

This is a continuation of application Ser. No. 13/692,739, filed Dec. 3, 2012, which is a continuation-in-part of application Ser. No. 13/289,613, filed Nov. 4, 2011, now U.S. Pat. No. 8,733,072, all of which are incorporated herein by reference in their entireties.

BACKGROUND

The present invention generally relates to internal combustion engines and outdoor power equipment powered by such engines, such as lawn mowers, snow throwers, portable generators, etc. More specifically, the present invention relates to a starter system and energy storage system for an engine.

Outdoor power equipment may use an internal combustion engine to drive a tool of the equipment, such as a rotary blade of a lawn mower or an axial cam pump of a pressure washer. Typically the outdoor power equipment includes a brake mechanism that selectively prevents or stops rotation of the tool. The brake may stop a flywheel of the engine, correspondingly stopping the crankshaft and rotating tool coupled to the power takeoff of the crankshaft.

Starting the braked outdoor power equipment may be cumbersome, requiring release of the brake followed by activation of the engine. For lawn mowers and other types of outdoor power equipment, release of the brake may include rotating a bail to draw an inner-wire of a Bowden cable that lifts the brake mechanism. Then, activation of the engine typically further includes manually pulling a recoil starter rope or activating an electric starter for the engine. A need exists for a less-cumbersome and faster process to start the outdoor power equipment.

Furthermore, the outdoor power equipment may include the engine mounted to a frame or a base plate. If an electric starter is included, the starter motor is typically connected to an interface on the handle of the outdoor power equipment so that the operator may activate the starter motor while standing in an operational position, such as behind the handle. During assembly of the outdoor power, a power source, control circuitry, and wiring associated with the starter motor are coupled to the handle, the frame, and the engine, the attachment of which may be a time-consuming and labor-intensive process. A need exists for an engine having a starter motor that facilitates efficient assembly of the outdoor power equipment.

SUMMARY

One embodiment of the invention relates to an internal combustion engine including a cylinder, an exhaust, a fuel tank, an engine cover, a power take off configured to drive an implement, an electric starting system including a starter motor, a battery receiving port, and a rechargeable battery removably attached to the battery receiving port, and an electric start control module including a switch configured to be actuated by a release mechanism configured to put the implement in the ready-to-run condition and a controller coupled to the switch, wherein the switch is configured to provide a signal when the release mechanism is in the engaged position, wherein the controller is configured to receive the signal, wherein the controller it configured to turn on the starter motor to start the internal combustion engine upon receipt of the signal from the switch and an input from a run sensor confirming that the implement is in the ready-to-run condition, and wherein the rechargeable battery is configured to power the starter motor to start the engine.

Another embodiment of the invention relates to an internal combustion engine including a cylinder, an exhaust, a fuel tank, an engine cover, a power take off configured to drive an implement, and an electric starting system including a starter motor, a battery receiving port, and a rechargeable battery removably attached to the battery receiving port, wherein the rechargeable battery is configured to power the starter motor to start the engine.

Another embodiment of the invention relates to outdoor power equipment including an internal combustion engine, an electric motor configured to start the internal combustion engine, a battery receiving port, a rechargeable battery removably attached to the battery receiving port, wherein the rechargeable battery is configured to power the electric motor to start the engine. an implement driven by the internal combustion engine, a release mechanism movable to an engaged position to put the implement in a ready-to-run condition in which the implement is ready to be driven by the internal combustion engine, a run sensor configured to detect the ready-to-run condition, a switch actuated by the release mechanism, and a control module coupled to the switch so that the switch provides a signal to the control module when the release mechanism is in the engaged position and the control module turns on the electric motor to start the internal combustion engine in response to the signal from the switch and the run sensor detecting the ready-to-run condition.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
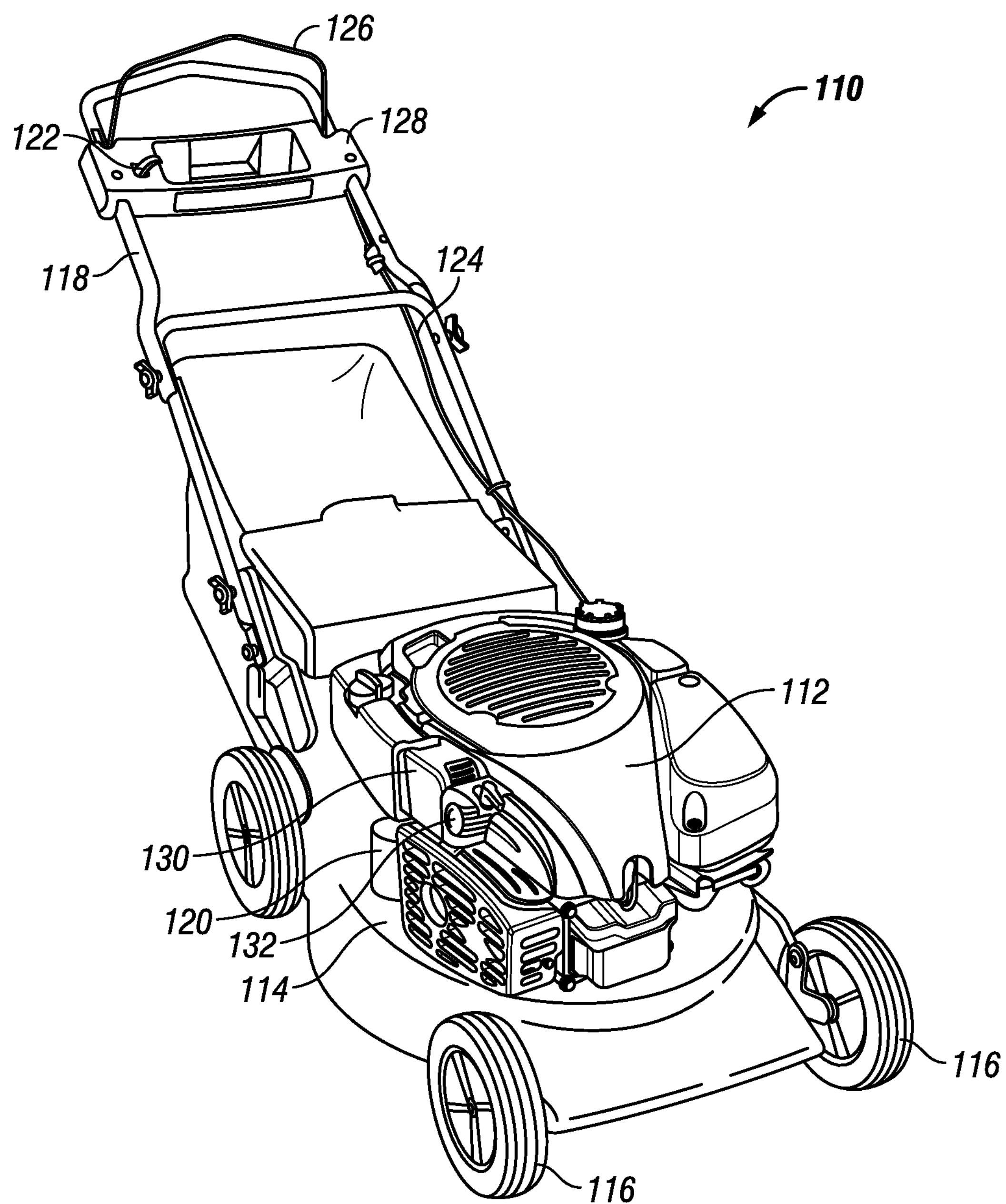
FIG. 1 is a perspective view of a lawn mower according to an exemplary embodiment of the invention.

Referring to FIG. 1, outdoor power equipment, in the form of a lawn mower 110, includes an internal combustion engine 112 coupled to a rotary tool, such as the blade in a deck 114 of the lawn mower 110, an auger, a saw, tines, a drill, a pump, or other rotary tools. In some embodiments, the lawn mower 110 further includes wheels 116 and a rearward extending handle 118 designed to be pushed by an operator walking behind the lawn mower 110. In other contemplated embodiments, the outdoor power equipment may be in the form of a rotary tiller, a pressure washer, a snow thrower, a lawn tractor or riding mower, an edger, a portable generator, or other equipment, with a corresponding powered tool, such as tines, a pump, an auger and impeller, an alternator, a drive train, or other tools.

Still referring to FIG. 1, the lawn mower 110 includes a starter system. According to an exemplary embodiment, the starter system includes an electric motor 120 that is selectively coupled to the engine 112 such that the electric motor 120 is configured to rotate the crankshaft of the engine 112 to start the engine 112, and is then configured to disengage once the engine 112 is running. In some embodiments, the motor 120 is fastened to the engine 112, such as being mounted on top of or to a side of the engine 112. Gearing (e.g., gear reduction, transmission) may extend between the motor 120 and the crankshaft of the engine 112, or the motor 120 may be connected directly to the crankshaft of the engine 112.

According to an exemplary embodiment, an operator may engage the starter system via the handle 118 of the lawn mower 110. In some embodiments, the handle 118 includes a lever 122, button, toggle, or other interface that the operator may use to command the starter system to start the engine 112. In some embodiments, the command is relayed from the handle 118 via a linkage 124, such as an electric wire transmitting an electrical signal, a Bowden cable communicating a mechanical signal, or another type of linkage. In contemplated embodiments, a transmitter and start button are coupled to the handle (e.g., clipped on, integrally mounted with), and the starter system includes an integrated receiver configured to receive commands wirelessly provided by the transmitter to start the engine. According to an exemplary embodiment, the command from the operator is received directly or indirectly by the motor 120, and the motor 120 rotates the crankshaft to start the engine 112.

In some embodiments, the starter system is integrated with a bail 126 of the lawn mower 110. A brake mechanism (e.g., friction brake, ignition interrupt switch or circuit, etc.) may be holding the blade or other tool, locking the crankshaft of the engine 112, or otherwise preventing operation of the power equipment. When the operator actuates the bail 126 to release the brake mechanism from rotating members (e.g., blade, crankshaft, power takeoff, flywheel) of the lawn mower 110, the action simultaneously actuates the motor 120 to start the engine 112. As such, releasing of the brake mechanism synergistically also starts the engine 112, easing operation of the lawn mower 110 or other outdoor power equipment by reducing the steps necessary for activation.

In some embodiments, the lawn mower 110 includes an interlock 128 (e.g., lock-out device, signal interrupt) to prevent release of the brake and engagement of the motor 120. According to an exemplary embodiment, the operator must release the interlock 128 before the bail 126 can be operated to engage the motor 120 to start the engine 112. Different types of mechanical and electrical interlocks may be used in varying contemplated embodiments to prevent inadvertent release of the brake and starting of the engine, such as when a user moves the power equipment into or out of a garage or storage shed by grabbing the handle, or if the bail is unintentionally bumped. Furthermore, engagement of the interlock 128, in some embodiments, is also configured to prevent inadvertent release of the brake when the handle 118 is being folded over the deck 114 to put the lawn mower 110 in a storage configuration.

In some embodiments, the interlock 128 may prevent a signal from being sent via the linkage 124 to engage the motor 120 and release the brake. The interlock 128 may physically disconnect the linkage 124 from the bail 126, such as by removing a linking pin that joins the bail 126 to the linkage 124, removing a clamp that holds the linkage 124 to the bail 126, or otherwise physically separating the bail 126 and linkage 124. Release of the interlock 128 then physically or electrically connects the bail 126 (or other brake release) to the controller 132 (e.g., control system, control circuit, computerized controller) such that operation of the bail 126 is communicated to the controller 132 to simultaneously start the engine 112.

In other embodiments, the interlock 128 physically prevents (e.g., blocks, holds, jams) rotation of the bail 126 when the interlock 128 is engaged. In some such embodiments, a cam may be rotated into or out of the path of the bail 126, optionally preventing rotation of the bail 126. In other such embodiments, a clamp of the interlock 128 may bind the bail 126 to the handle 118, preventing rotation of the bail 126 until released. In still other such embodiments, a sleeve or latch may slide over the bail 126, holding the bail at a fixed angle until released. The mechanical interlock described in this paragraph may be used in an embodiment where no electrical wiring harness on the handle 118 is required to support the starting of the electric motor 120 and engine 112.

In contemplated embodiments, an electrical signal may indicate to the controller 132 that the interlock 128 has been released, such as a signal communicated via the linkage 124, via radio frequency communication, hardwired, or otherwise. The signal is provided in addition to a separate signal associated with movement of the bail 126. Without the signal indicating release of the interlock, the signal associated with movement of the bail will not be sufficient to instruct the controller to start the engine. The electrical signal may be associated with a pass code, a key, a scanned finger print, or other access-limiting device.

According to an exemplary embodiment, the lever 122 (e.g., interface, release mechanism, trigger) may serve to release the interlock 128, allowing operation of the bail 126 to release the brake and to start the motor 120. In some embodiments, pulling of the lever 122 may move a physical obstacle out of the rotational path of the bail 126. In other embodiments, pulling of the lever 122 may mechanically or electrically connect the bail 126 and the linkage 126. Other mechanisms, such as buttons, switches, toggles, dials, etc., may serve as release mechanisms to release the interlock 128. In some embodiments, conventional mechanical rotational interlocks or electrical switches (e.g., signal disconnects) are used as the interlock.

In general, integration of the starter system with a handle of outdoor power equipment allows the operator to start the engine from the rear of the outdoor power equipment, such as several feet from the powered tool of the outdoor power equipment (e.g., snow thrower auger, lawn mower blades). Further, the integration supports an electric starting system for a walk behind mower that can be engaged by a user without actuation of a key or push-button. In other embodiments, the starter system may include a start button or other interface to engage the starter system that is located on the engine or elsewhere. For example, in contemplated embodiments, such an interface may include a smart phone application or remote control that wirelessly provides a start command or authorization code to a receiver coupled to the outdoor power equipment.

Figure 4:
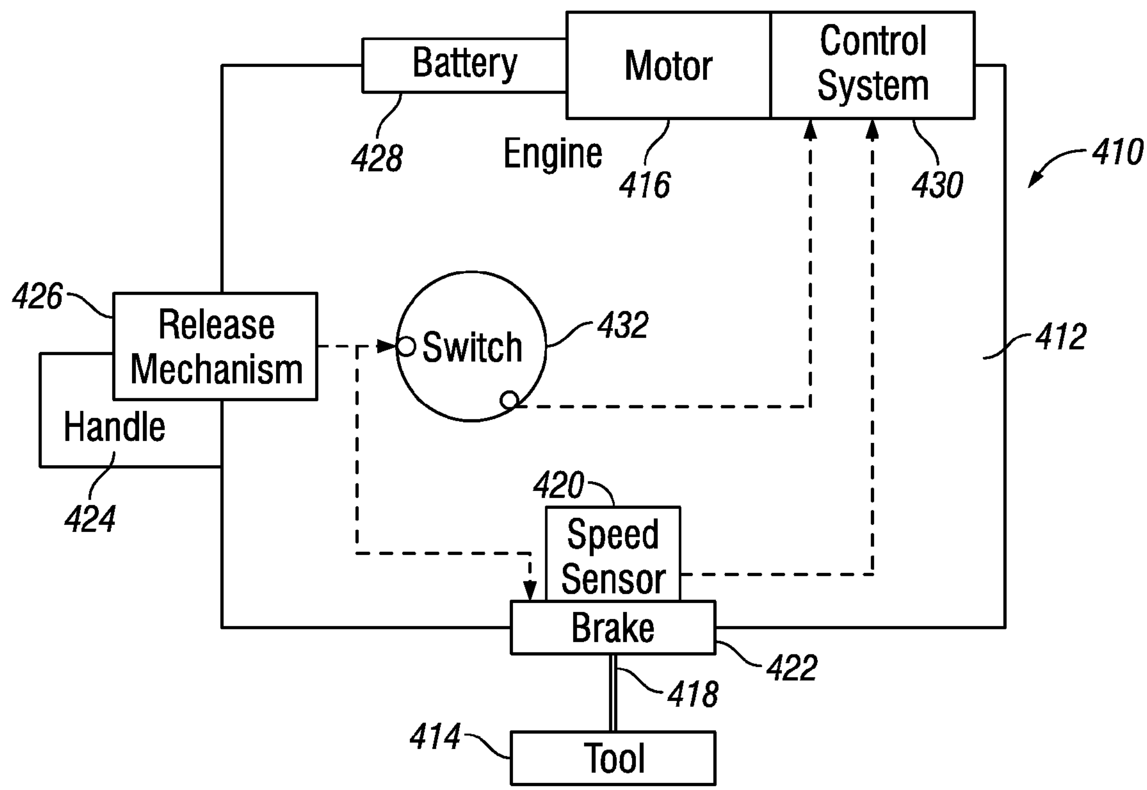
FIG. 4 is a schematic diagram of a starter system for an engine according to an exemplary embodiment of the invention.

According to an exemplary embodiment, the starter system further includes an energy storage device 130 (e.g., electrical storage device) and a controller 132. The energy storage device 130 may include one or more batteries, capacitors, or other devices. When the operator engages the starter system, the linkage 124 communicates the command to start the engine directly or indirectly to the controller 132, which electrically connects the energy storage device 130 to power the motor 120. In some embodiments, the controller 132 is coupled to a governor of the engine 112 (see, e.g., speed sensor 420 as shown in FIG. 4), and disengages the motor 120 (e.g., cuts power to the motor 120, high-side switching of the battery power source, low-side switching of the ground side of the circuit) when the engine 112 is running at a sufficient speed.

In some embodiments, the motor 120, the energy storage device 130, and the controller 132 are fastened directly to the engine 112, which may be configured for efficient assembly of outdoor power equipment using the engine 112. As such, the starter system in some embodiments may come fully assembled with the engine 112 and ready for connection to a linkage configured to provide a signal from the handle (e.g., linkage 124). In some embodiments, an interface (e.g., start button, toggle, switch) for starting the engine is positioned on the engine itself, and no additional connections are necessary—the manufacturer need only attach the engine to the deck or corresponding feature and attach the tool to the power takeoff of the engine. In any such case, considerable time and effort may be saved during the manufacturing process and a potential source of manufacturing difficulty may be removed (i.e., that associated with the fastening and electrical connection of the components of the starter system during assembly of the outdoor power equipment). In still other embodiments, some or all of the starter assembly may be fastened to the deck of a lawn mower or corresponding feature of other power equipment.

Figure 2:
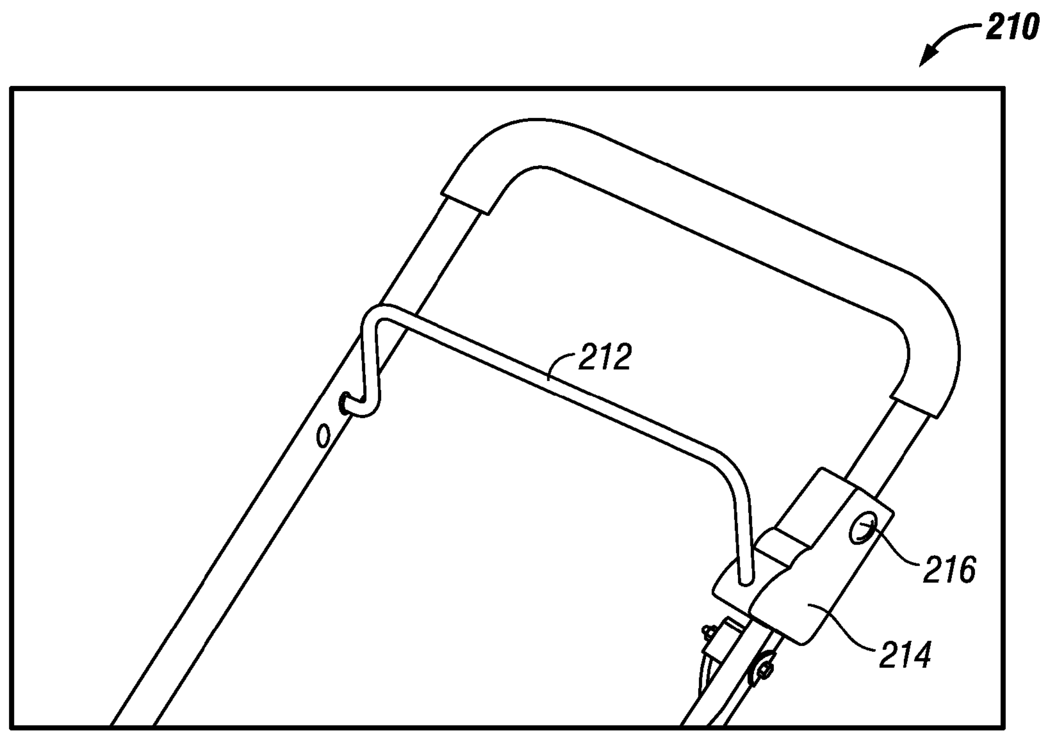
FIG. 2 is a perspective view of a handle for outdoor power equipment according to an exemplary embodiment of the invention.
Figure 3:
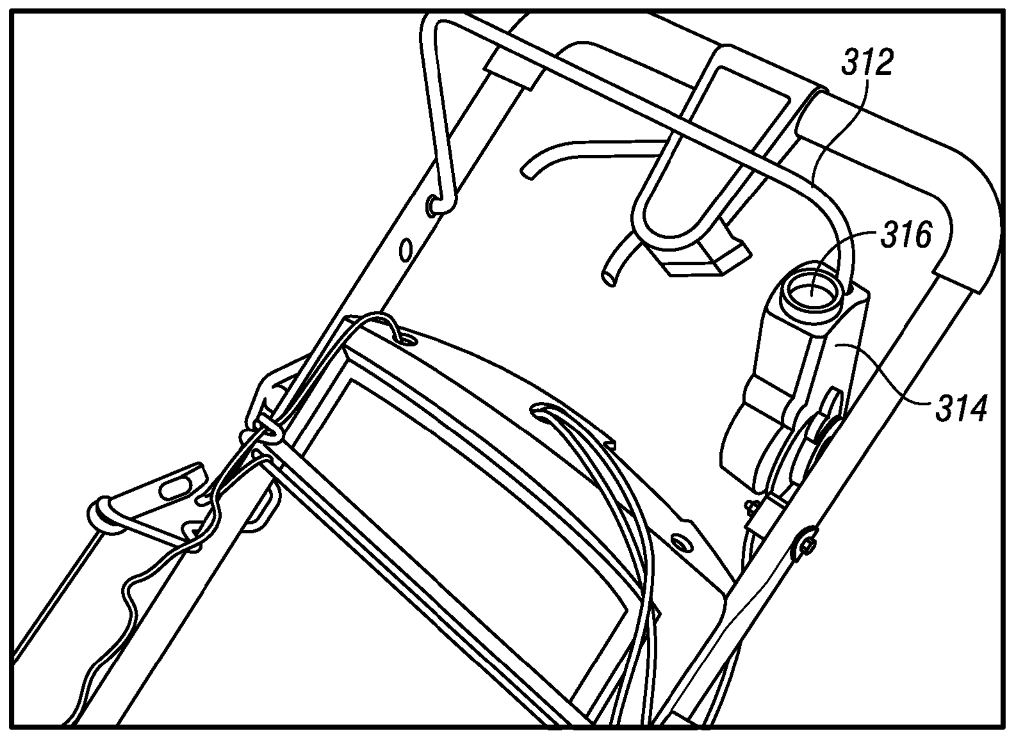
FIG. 3 is a perspective view of a handle for outdoor power equipment according to another exemplary embodiment of the invention.

Referring to FIGS. 2-3, handles 210, 310 for outdoor power equipment, such as a lawn mower, rotary tiller, snow thrower, etc., each include a bail 212, 312 and an interlock 214, 314 with a release button 216, 316. In contemplate embodiments, the release button 216, 316 may release the bail 212, 312 from being interlocked by allowing the bail 212, 312 to move, or by coupling the bail 212, 312 and linkage 124. In FIG. 2, the release button 216 is to the side of the bail 212, while in FIG. 3, the release button 316 for the interlock 314 is on top of the bail 312. The release button 216 of FIG. 2 may disengage a member from blocking movement of the bail, while the release button 316 may connect the bail 312 and linkage 124. In other contemplated embodiments, release buttons or other release mechanisms may be positioned elsewhere on the handle, the engine, or on another component of the outdoor power equipment.

Still referring to FIGS. 2-3, in other contemplated embodiments, the buttons 216, 316 may be used to provide a signal directly or indirectly to a motor to start an engine, without regard to the bail 212, 312. However, integrating the buttons 216, 316 with the bail 212, 312 allows for a two-step process to start the engine (i.e., release interlock and operate bail), while synergistically using the operation of the bail 212, 312 to both release the brake as well as to engage the starter. In still other embodiments, other forms of interlocks and release mechanisms for the interlocks may be used, such as a biased lever (see lever 122 of interlock 128 as shown in FIG. 1), latch, thumb-print reader, etc.

In some embodiments, a three-step process is used to engage the power equipment, such as first disabling or releasing an interlock; second presenting a key, a code, or other device to release an access-control mechanism (e.g., lock out, lock); and third pulling the bail. In alternate embodiments, the key hole or interface for the access-control mechanism may be positioned on the handle or on the engine.

Referring to FIG. 4, outdoor power equipment 410 (shown schematically) includes an engine 412 and a powered tool 414 (e.g., rotary blade) driven by the engine 412. In some embodiments, a motor 416 is coupled to the engine 412, and the powered tool 414 is coupled to a power takeoff 418 of the engine 412. A speed sensor 420 (e.g., governor) may be coupled to the engine 412 to regulate the speed of the engine 412. Also, a brake 422 may be coupled to a rotary member of the outdoor power equipment 410, such as the flywheel of the engine, the power takeoff 418 of the engine, etc., to stop the engine as well as the associated powered tool.

In some embodiments, the outdoor power equipment 410 includes a handle 424 having a release mechanism 426, where the release mechanism 426 is configured to allow a user to release the brake 422 from the handle 424. The release mechanism 426 may allow a user to release the brake 422 by engaging the bail (or other element) with a linkage connected to the brake 422, or by disengaging an element blocking movement of the bail. The handle 424 may be coupled to the engine 412 and tool 414 directly, or via an intermediary member (e.g., deck 114 as shown in FIG. 1). The engine 412 may further include a battery 428 for powering the motor 416 and a control system 430 for operating the motor 416.

According to an exemplary embodiment, the control system 430 is configured to receive inputs associated with the release mechanism 426. In some embodiments, when the release mechanism 426 is actuated to release the brake 422, the release mechanism 426 triggers a switch 432, which provides to the control system 430 a signal that is indicative of the release of the brake 422. The signal may be provided via a mechanical linkage, wirelessly, a hardwired electrical connection, or otherwise. In some embodiments, the control system 430 then actuates the motor 416 to start the engine 412 or uses the information in control logic configured to start the engine as a function of the status of the brake and other factors. As such, operation of the release mechanism 426 may simultaneously provide a start signal to the control system 430 as well as release the brake 422. No additional operations to start the engine 412 may be required.

According to an exemplary embodiment, the control system 430 is configured to receive additional inputs from the speed sensor 420 or another component of the engine 412 (e.g., ignition circuit). The speed sensor 420 or other component provides the control system 430 with information associated with the speed of the engine 412. When the engine 412 is running at a sufficient speed, the control system 430 then disengages the motor 416 (e.g., turns off, disconnects, cuts power to, etc.).

In contemplated embodiments, the control system 430 associated with the start system may receive additional or different inputs used to control starting of the engine, such input from a sensor configured to indicate whether the outdoor power equipment has moved recently. Movement of an axle or wheels of such outdoor power equipment may trigger a sensor that provides a signal to the control system. The signal, in combination with an electric timer providing time-related context for the movement, may serve as an additional indicator that the operator intends to activate the engine. In contemplated embodiments, the control system 430 includes a timer and is configured to deactivate the motor if the engine has not started within a predetermined amount of time. In some contemplated embodiments, the control system 430 includes a temperature sensor and is configured to prime the engine with an automated primer pump or adjust the choke or throttle plate if ambient temperature is above or below a predetermined temperature, if a portion of the engine is above or below a predetermined temperature, or if the difference between ambient and engine temperature is above or below a predetermined amount. In contemplated embodiments, the control system 430 may also provide a signal output to the operator, such as a visible indicator on a display coupled to the handle or engine, or an audible alert. In some such embodiments, the signal output may include as an error message, a low-fuel message, a replace-oil message, or another such message.

Figure 5:
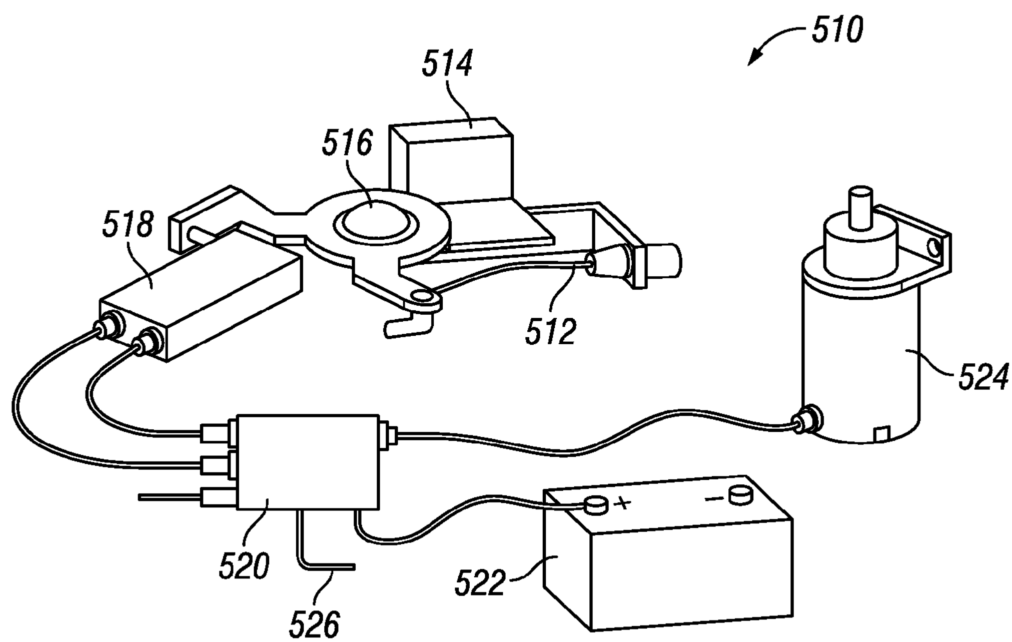
FIG. 5 is a perspective view of components of a starter system for outdoor power equipment according to an exemplary embodiment of the invention.

Referring to FIG. 5, components of a system 510 include a brake cable 512 (e.g., Bowden cable) and a brake pad 514 for an associated engine of outdoor power equipment. According to an exemplary embodiment, the brake cable 512 is configured to be coupled to the bail of a handle of outdoor power equipment (see, e.g., bails 126, 212, and 312 as shown in FIGS. 1-3). When an operator activates the bail, the brake cable 512 moves a pivot 516 coupled to the brake pad 514. The brake pad 514 then releases, allowing the engine associated with the system 510 to drive a powered tool of the outdoor power equipment.

According to an exemplary embodiment, the engine associated with the system 510 further includes a starter system including a switch 518, an electronic control 520, a battery 522, and an electric starter motor 524. When the operator activates the bail to lift the brake pad 514, the pivot 516 simultaneously activates the switch 518. The switch 518 then provides a signal to the electronic control 520 that the brake pad 514 has been lifted and that the electronic control 520 may start the engine associated with the system 510 with the electric starter 524. The electronic control 520 then connects the electric starter 524 to the battery 522. The switch 518 may be a switch already associated with the brake, but used to provide signals to both an actuator of the brake and the starter system (e.g., ignition ground), or the switch 518 may be an additional switch solely used for the starter system.

Still referring to FIG. 5, the electronic control 520 includes hard-wired circuitry and is configured to receive additional inputs from the engine associated with the system 510. In some embodiments, the additional inputs include an indication of the speed of the engine associated with the system 510 from a governor or other component of the engine (e.g., electrical pulses from the ignition system). The additional inputs may include a current state of the engine associated with the system 510, such as whether the engine associated with the system 510 is running, etc. The starter system is also coupled to a ground 526.

Referring to FIGS. 6-9, an engine 610 includes an exhaust 612, a fuel tank 614, an engine cover 616, an air intake 618 for combustion processes, an air intake 620 for cooling the engine, and a starter system having an energy storage device, such as a battery 622, a capacitor, multiple batteries or capacitors, or another energy storage device. Applicants note that the engine 610 of FIGS. 6-9 mirrors the engine 112 of FIG. 1, and both are single-cylinder, four-stroke cycle, vertically-shafted, small engines. Other engine types and designs may be used, such as engines that are horizontally-shafted, two- or more cylindered, diesel powered, cold-weather structured, etc.

Figure 6:
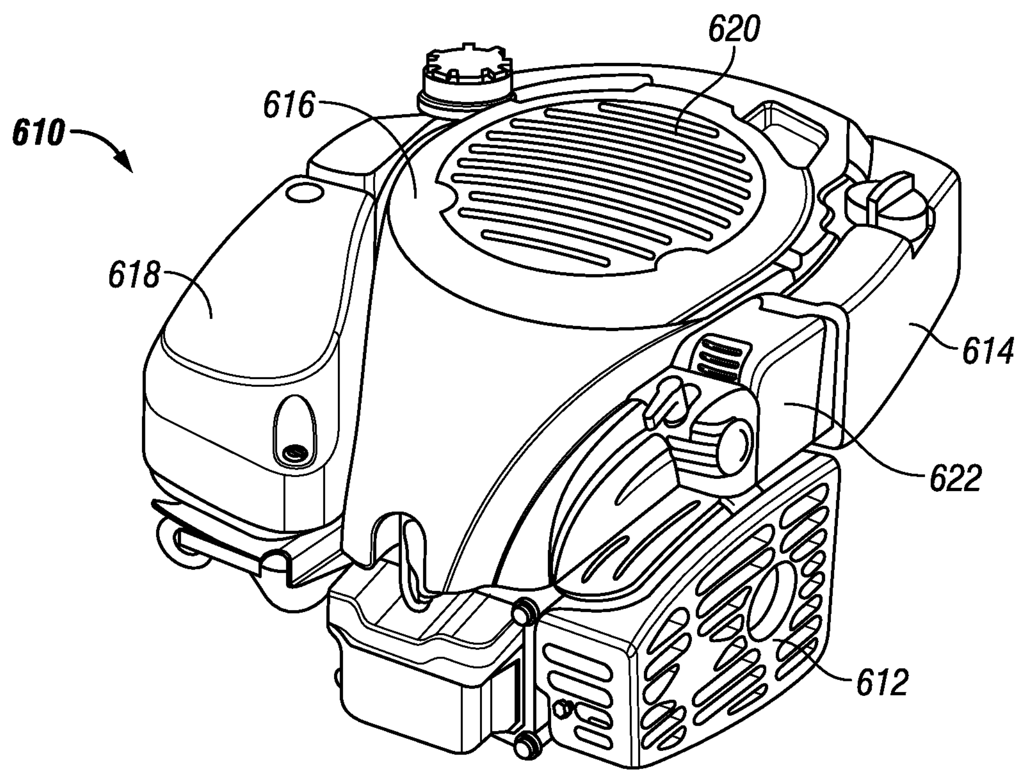
FIG. 6 is a perspective view of an engine assembly according to an exemplary embodiment of the invention.
Figure 8:
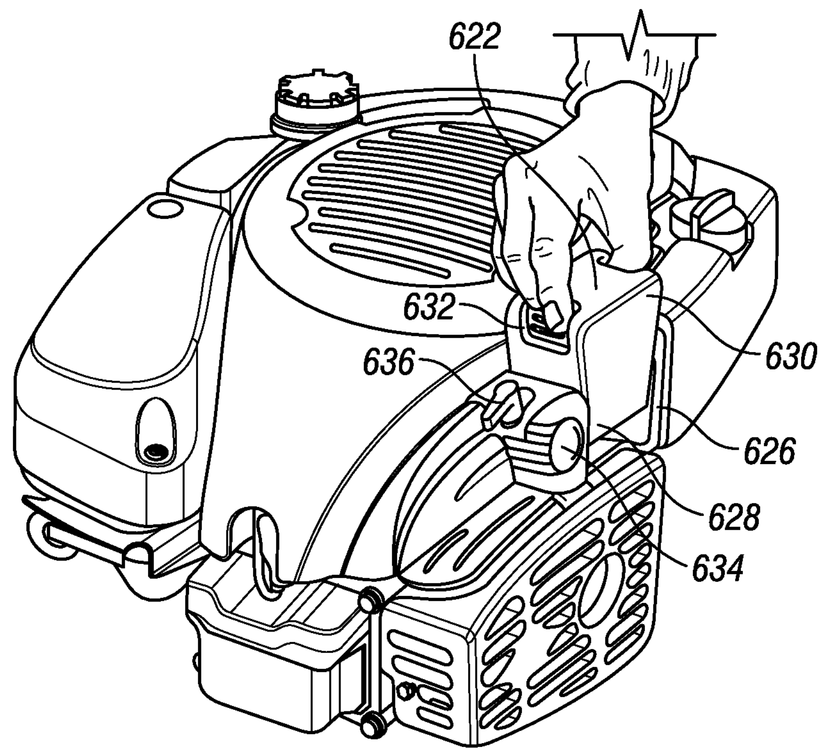
FIG. 8 is a perspective view of a battery being coupled to an engine according to an exemplary embodiment of the invention.
Figure 9:
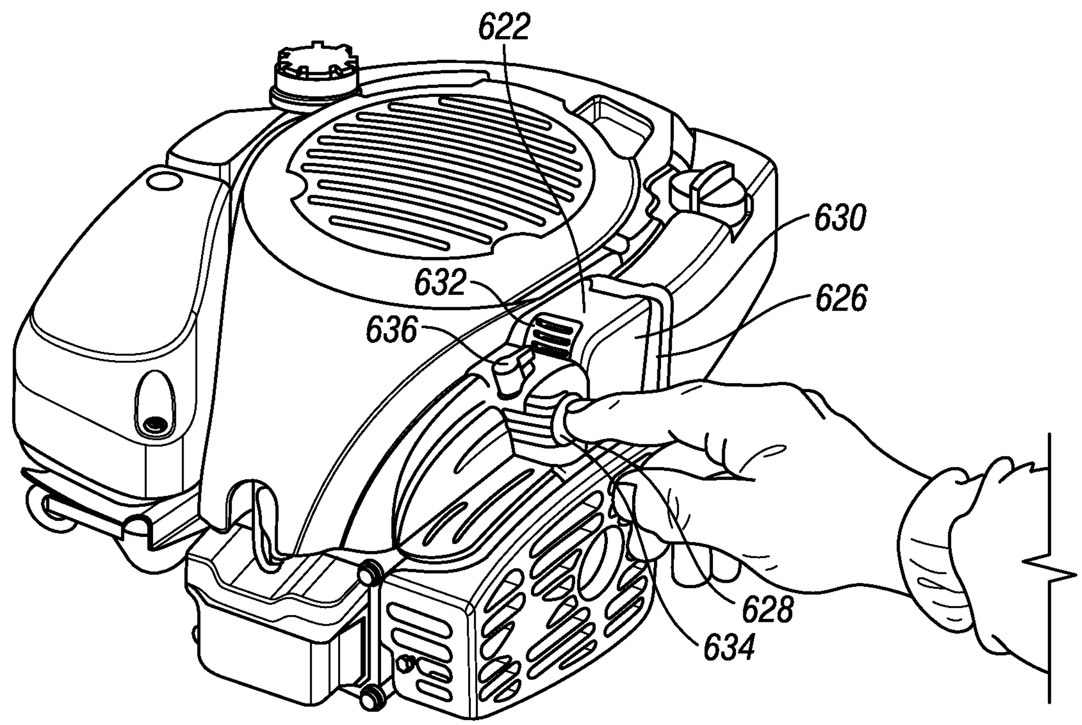
FIG. 9 is a perspective view of a starter for the engine assembly of FIG. 6 according to an exemplary embodiment of the invention.

Although shown as proximate to the fuel tank 614 and exhaust 612 in FIGS. 6 and 8-9, the energy storage device may be positioned elsewhere on the exterior and/or in an internal port of the engine 610. In some embodiments, where the energy storage device is sensitive to high temperature, it may be preferred to position the energy storage device away from the exhaust 612, which may become hot during operation of the engine 610.

According to an exemplary embodiment, the energy storage device is configured to power a starter motor (see, e.g., motor 120 as shown in FIG. 1) integrated with the engine 610. In some embodiments, the energy storage device may be further configured to power other systems of the engine 610, such as an engine control unit (ECU) having control circuitry coupled to sensors or detectors integrated with the engine (e.g., brake release, fuel-level detector, ignition-fouling detector, governor, etc.).

Figure 7:
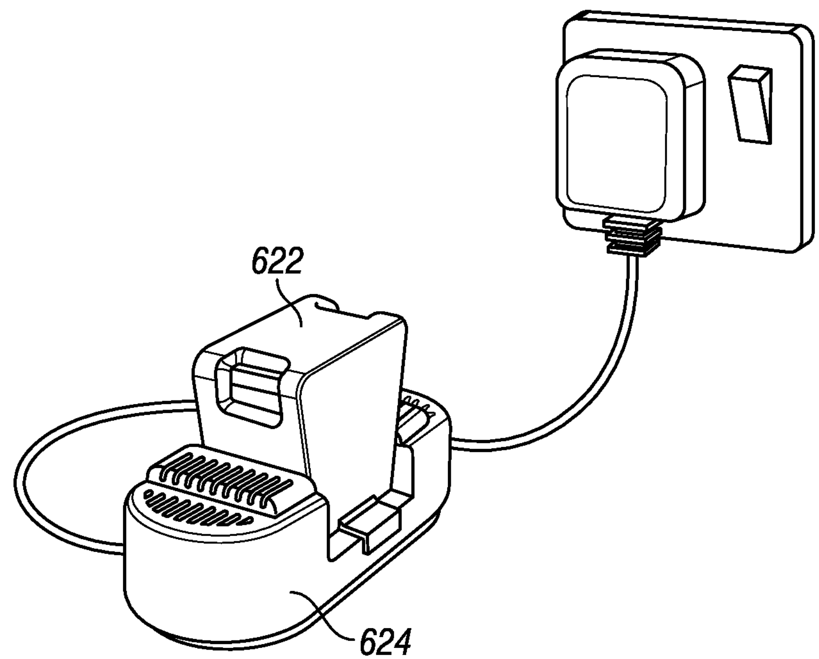
FIG. 7 is a perspective view of a battery charging station according to an exemplary embodiment of the invention

According to an exemplary embodiment, the energy storage device is the battery 622, which is rechargeable. As shown in FIG. 7, the battery 622 may be charged at a charging station 624 or may include a charging port integrated with the battery (e.g., battery pack with charging port to receive a connection from a wire coupled to an outlet or the charging station). The battery 622, in other embodiments, may alternatively plug directly into a wall outlet, or the charging station may be wall mounted or plug directly into a wall outlet.

In some embodiments, the energy storage device is or includes a bank of capacitors, where the capacitors are configured to charge and release electrical energy in a relatively short (e.g., less than 10 seconds), high-powered output. In some such embodiments, some of the capacitors of the bank are coupled with one another in groups (e.g., series or parallel), and the groups are configured to output sequentially in time with respect to one another. Accordingly, the capacitors are specifically configured to be able to power the motor to start the engine 610 without much additional energy storage capacity so as to be relatively compact in size and inexpensive. Use of capacitors may also allow for faster charging when compared to batteries, such as faster charging on the charging station 624 (FIG. 7).

In contemplated embodiments, the starter motor is configured to draw power from the engine 610, such as during periods of lesser loads on the engine. The starter motor is then driven by the engine 610 to provide an electric output. The electric output may then be routed by the ECU or otherwise to the charge the energy storage device. Such a system may be particularly useful for an engine driving an alternator of a portable generator, where the alternator may temporarily be powered by the energy storage device to start the engine and then, once the engine has started, the alternator may be used to recharge the energy storage device.

Referring to FIG. 8, the battery is configured to be inserted (e.g., dropped, lowered, placed) into a receiving port 626 integrated with the engine. Integrating the receiving port with the engine reduces the assembly burdens for manufacturing outdoor power equipment, as disclosed above. However in contemplated embodiments, the receiving port may not be integrated with the engine. For example, FIG. 7 shows a charging station 624 or charging port, which may be similar to such a port on a deck of the engine.

In some embodiments, the battery 622 has a cross section forming an isosceles trapezoid, triangle, diamond, or other wedge shape, or shape having a narrower lower portion 628 relative to an upper portion 630 in contact with the receiving port 626. The receiving port 626 is contoured (e.g., V-shaped, U-shaped, etc.) to receive the battery 622, which may be guided into position by interfacing with the contours of the receiving port 626 and gravity.

In some embodiments, the battery 622 includes slots or grips 632 for lifting and holding the battery 622. A locking mechanism, such as a hook or latch may snap into place when the battery 622 is inserted into the receiving port 626 and hold the battery 622 in the receiving port 626. Pinching the grips 632 together may release the locking mechanism to allow removal of the battery 622 from the receiving port 626.

According to an exemplary embodiment, the starter system further includes a switch 636 (e.g., toggle, lever, key) that is integrated with the battery 622, the receiving port 626, or elsewhere on the engine 610. As shown in FIGS. 8-9, the switch 636 may rotate from an off position (FIG. 8), where the battery 622 is not electrically connected to components of the engine 610 (e.g., starter motor, ECU), to an on position (FIG. 9), where the battery 622 is electrically connected to the components. In other embodiments, rotation of the switch 636 also or alternatively engages the locking mechanism to hold the battery 622 in the receiving port 626. In various contemplated embodiments, the switch 636 may be configured to interrupt electrical connectivity of the battery, the control circuit, or both.

According to an exemplary embodiment, the starter system includes an interface, such as a button 634 on the receiving port 626. The button 634 faces outward and is accessible when the battery 622 is seated in the receiving port 626. In some embodiments, the interface allows the operator to start the engine via the starter system. In other embodiments, the interface may be used to initiate charging of the battery or another function.

Figure 10:
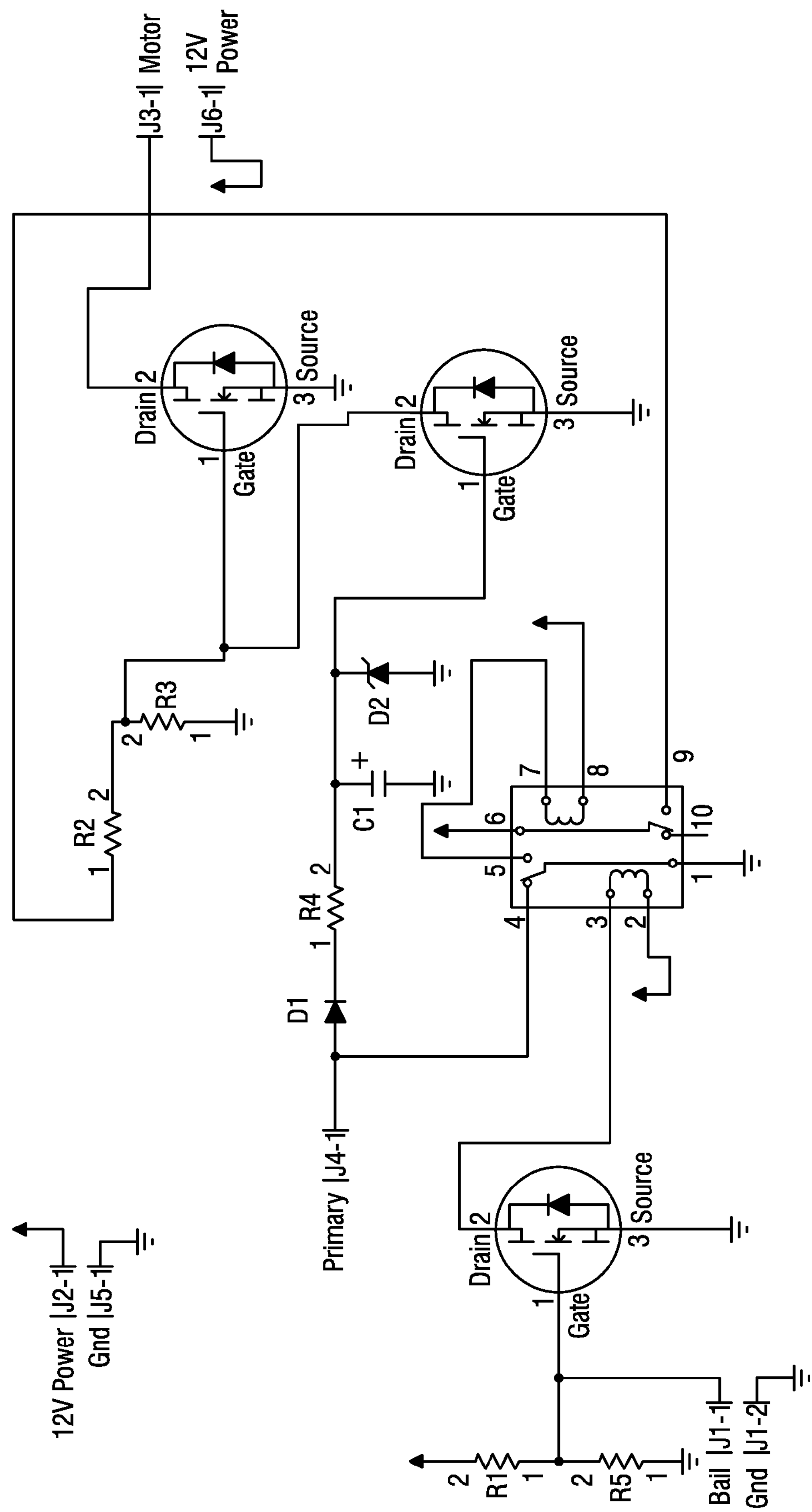
FIG. 10 is a circuit diagram of a controller for a starter of an engine according to an exemplary embodiment of the invention.
Figure 11:
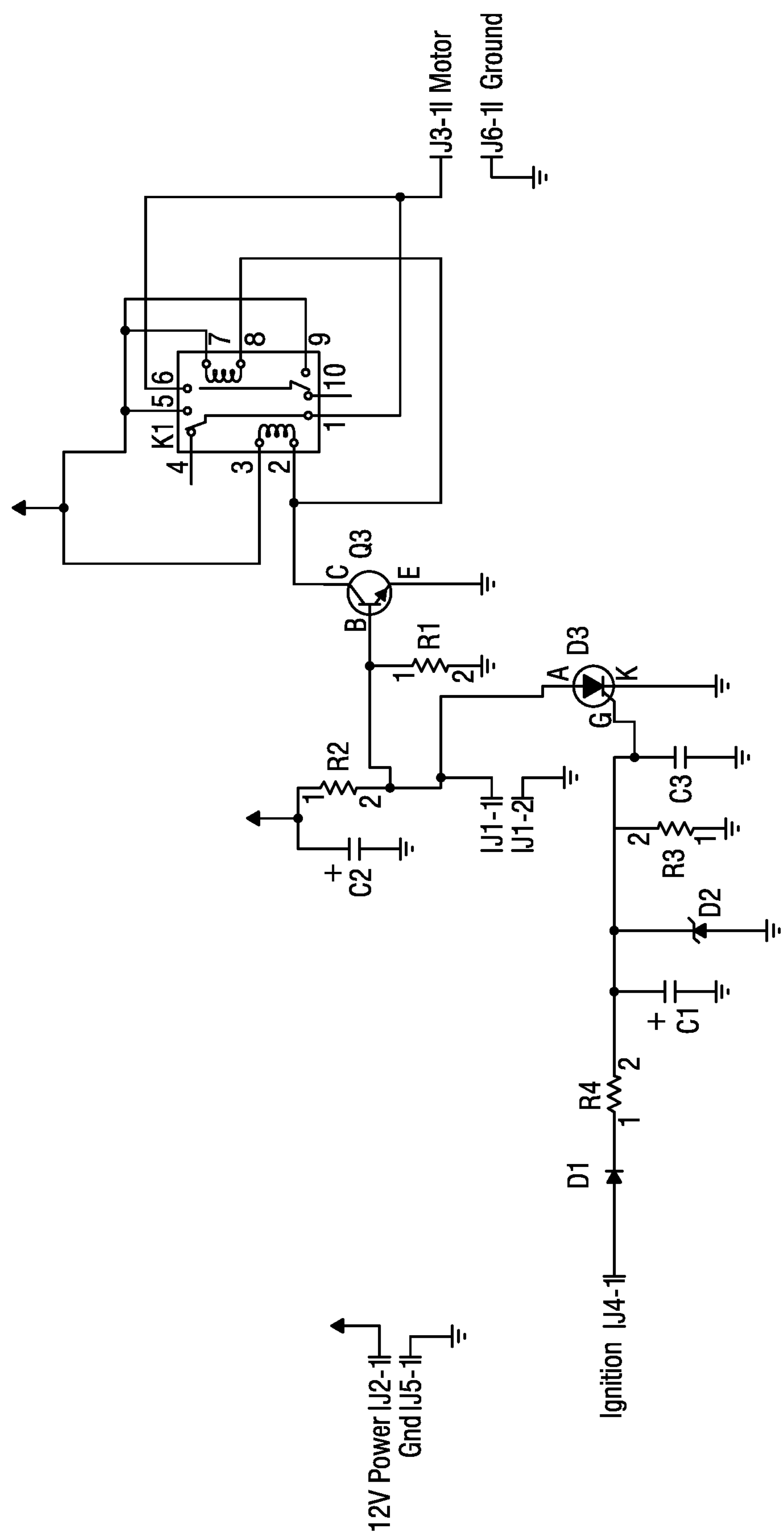
FIG. 11 is a circuit diagram of a controller for a starter of an engine according to another exemplary embodiment of the invention.

According to an exemplary embodiment, the electrical control circuits shown in FIGS. 10-11 are each configured provide hard-wired logic for a starter system according to the disclosure provided herein. In some embodiments, each circuit contains essentially all analog parts. In some embodiments, each circuit or another such circuit is configured to detect when the bail closes (or opens) a switch (see, e.g., switch 518 as shown in FIG. 5). In other embodiments, a circuit is configured to sense when the brake is pulled (see, e.g., brake pad 514 as shown in FIG. 5), and then to enable ignition of the engine. In other contemplated embodiments, a circuit may be further configured to sense vibration of the engine or Venturi vacuum strength in the carburetor, and cut power to the motor when the associated information indicates that the engine is running.

According to an exemplary embodiment, the circuits of FIGS. 10-11 are contained on circuit boards that are integrated with the engine (see, e.g., controller 132 as shown in FIG. 1), and may be fully powered by the battery or other on-board source. Accordingly, the circuits may require no electrical interface to components of the lawn mower or other outdoor power equipment aside from those carried by or integrated with the engine. No additional wiring or hook ups are required. Accordingly, the assembly process for the associated outdoor power equipment may be improved, as discussed above.

Figure 12:
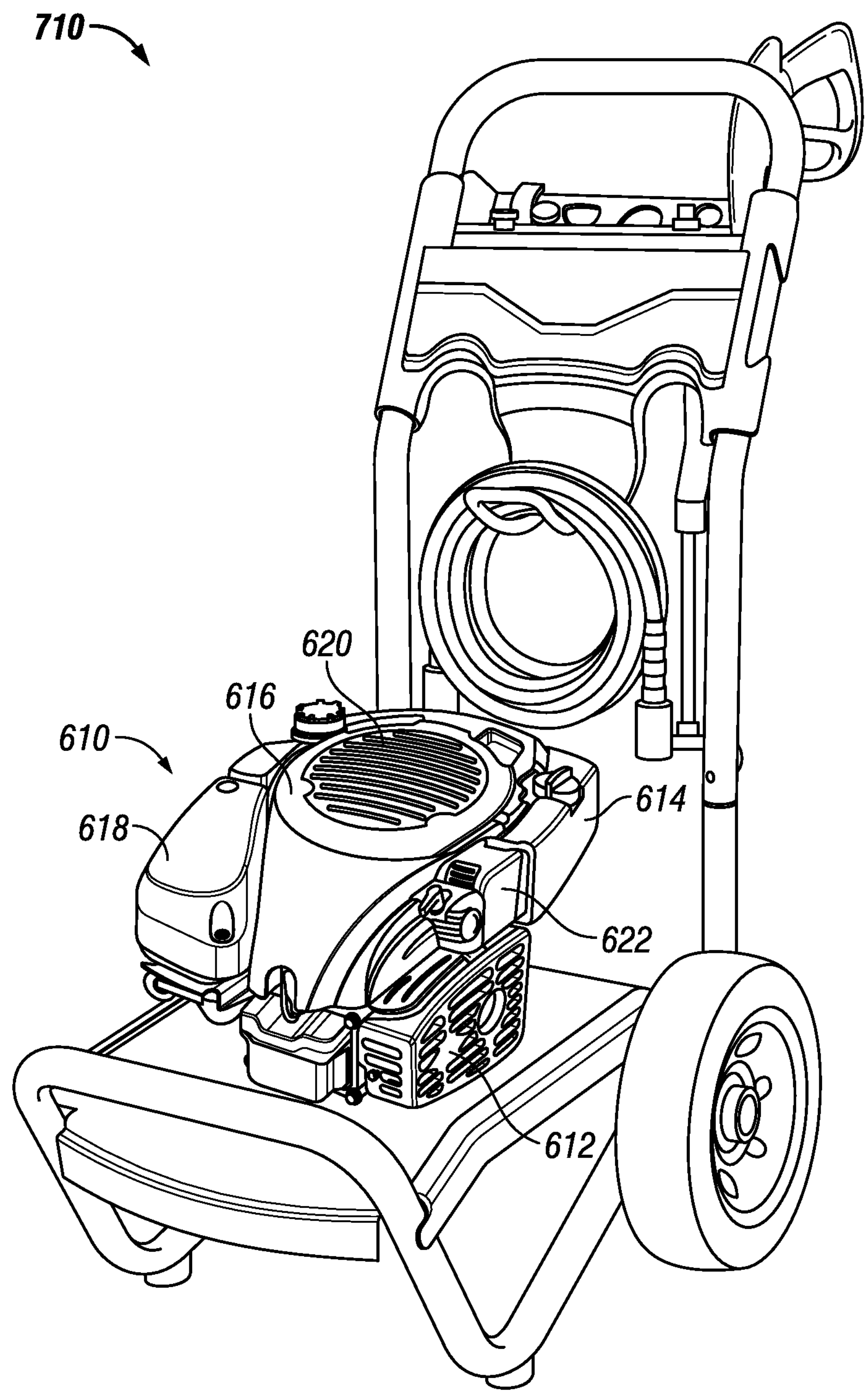
FIG. 12 is a perspective view of a pressure washer according to an exemplary embodiment of the invention.

Referring now to FIG. 12, a pressure washer system 710 includes the engine 610 of FIG. 6. To start the engine 610, an operator may press the button 634 shown in FIGS. 8-9. In some such embodiments, braking of the system may occur via an ignition interrupt that prevents sparks from igniting fuel and air in a combustion chamber of the engine 610. Resistance provided by the water pump of the pressure washer system 710 then slows (i.e., brakes) the engine 610. In other contemplated embodiments, an engine of a portable generator may use a similar starter system and battery 622, as well as a similar braking system. Power provided by the generator may be used to charge the battery 622 of the starter system.

Figure 13:
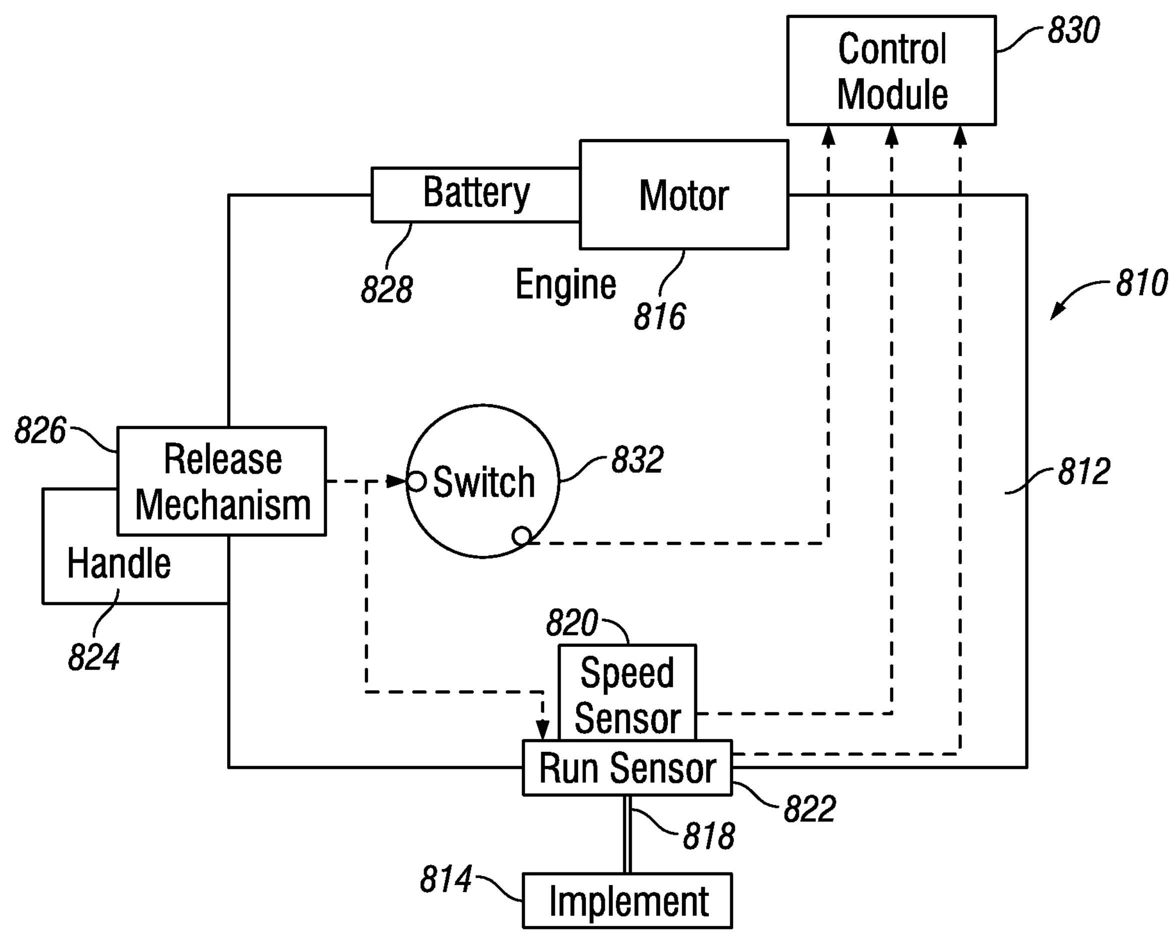
FIG. 13 is a schematic diagram of outdoor power equipment according to an exemplary embodiment of the invention.

Referring now to FIG. 13, outdoor power equipment 810 is illustrated schematically. Outdoor power equipment 810 is similar to outdoor power equipment 410 described above.

Outdoor power equipment 810 includes an engine 812 and an implement 814 (e.g., mower blade, pump, auger, tiller, alternator, brush, log-splitter, etc.) driven by the engine 812. In some embodiments, an electric motor 816 (e.g., a starter motor) is coupled to the engine 812, and the implement 814 is coupled to a power takeoff 818 of the engine 812. A speed sensor 820 may be coupled to the engine 812 to detect the speed of the engine 812. A run sensor 822 is configured to detect when the implement 814 is in a ready-to-run condition. Depending on the type of outdoor power equipment 810, the run sensor 822 can take different forms. For example, the run sensor 822 may be a switch configured to detect the state (e.g., engaged or disengaged) of a brake or clutch (e.g., for a lawn mower), a switch configured to detect operator presence in the operating position (e.g., a seat switch on a tractor or a hand-actuated switch or bail on a handle), an enable fob or key configured to allow the engine 812 to start when actuated or present and prevent the engine 812 from starting when not actuated or present, a switch configured to sense water or another fluid (e.g., a capacitive water detection sensor, a pressure sensor, a flow sensor) to ensure that a pump has sufficient fluid to operate safely (e.g., for a pressure washer or waste pump).

For example, in a lawn mower including a mower blade as the implement 814, the run sensor 822 detects when a brake that selectively prevents the blade from rotating is in a released position so that the blade is allowed to rotate. The mower blade is in the ready-to-run condition when the brake is released. In another example, in a pressure washer including a fluid pump as the implement 814, the run sensor 822 detects a threshold fluid flow through the fluid pump to a spray gun. The fluid pump is in the ready-to-run condition when the threshold fluid flow is detected (e.g., by flow rate, by flow volume, by fluid pressure, etc.) that is indicative of sufficient fluid supplied to the fluid pump to allow for operation of the fluid pump. In another example of a pressure washer including a fluid pump as the implement 814, the fluid pump is in the ready-to-run condition when the run sensor 822 detects the presence or actuation of an enable key or fob. In some embodiments, the outdoor power equipment 810 includes more than one run sensor 822 and all the run sensors 822 must be satisfied before the implement 814 is considered to be in the ready-to-run condition.

A release mechanism 826 (e.g., a bail for a lawn mower, a spray gun trigger for a pressure washer, a start button or switch, etc.) is movable to an engaged position to put the implement 814 in the ready-to-run condition. In a lawn mower example, the release mechanism 826 can be a bail connected to a handle 824 and the bail is configured to allow a user to release the brake by moving the bail to the engaged position. The run sensor 822 detects that the brake is released, thereby putting the mower blade into the ready-to-run condition. If the bail is not moved to the engaged position (e.g., when the bail is blocked by an interlock as described above), the brake is not released and the mower blade will not be put in the ready-to-run condition.

In a pressure washer example, the release mechanism can be the trigger of a spray gun fluidly connected to a fluid pump. The trigger is configured to allow fluid to flow through the spray gun when the trigger is moved to the engaged or open position. The trigger in the open position allows a threshold fluid flow through the fluid pump that is indicative of the fluid pump in the ready-to-run condition. The run sensor 822 detects the threshold fluid flow. If the threshold fluid flow is not established, the fluid pump is not in the ready-to-run condition and the ready-to-run condition is not detected by the run sensor 822. For example, this may happen if the pressure washer is not connected to a fluid supply (e.g., a water faucet or outlet), or there is a leak or loose connection between the pressure washer and a fluid supply. Alternatively, in some embodiments, the release mechanism 826 can be a start actuator (e.g., a start push-button or key-switch).

Outdoor power equipment 810 also includes a battery 828 for powering the motor 816 and other components of the outdoor power equipment 810 and an electric start control module 830 for operating the motor 816. As illustrated in FIG. 13, the control module 830 is spaced apart from (separate from, distinct from) the engine 812. The control module 830 is configured to receive inputs associated with the release mechanism 826 and the run sensor 822. In some embodiments, when the release mechanism 826 is moved to the engaged position, the release mechanism 826 actuates a switch 832, which provides a signal to the control module 830. The signal may be provided via a mechanical linkage, wirelessly, a hardwired electrical connection, or otherwise. The control module 830 checks the run sensor 822 to determine if the implement 814 is in the ready-to-run condition. When both the switch 832 and the run sensor 822 provide signals or inputs indicating the implement 814 is in the ready-to-run condition, the control module 830 then actuates the motor 816 to start the engine 812. Additional information or control logic may also be configured to start the engine in combination with the status of the switch 832, the run sensor 822 and/or other factors. Movement of the release mechanism 826 to the engaged position can simultaneously provide a start signal to the control module 830 via the switch 832 as well as put the implement 814 in the ready-to-run condition as detected by the run sensor 822, such that no additional user operations are required to start the engine 812.

According to an exemplary embodiment, the control module 830 is configured to receive additional inputs from the speed sensor 820. The speed sensor 820 provides the control module 830 with information associated with the speed of the engine 820. In some embodiments, the speed sensor 820 is configured to detect when the engine 812 is running at a threshold speed. When the engine 812 is running at the threshold speed, the control module 830 then turns off the motor 816 (e.g., disengages, disconnects, cuts power to, etc.). In some embodiments, the speed sensor 820 is a component of or otherwise coupled to an ignition coil of the engine to detect the engine speed. In other embodiments, the speed sensor 820 is a component of or otherwise coupled to a governor to detect the engine speed.

In contemplated embodiments, the control module 830 associated with the start system may receive additional or different inputs used to control starting of the engine, such input from a sensor configured to indicate whether the outdoor power equipment has moved recently. Movement of an axle or wheels of such outdoor power equipment may trigger a sensor that provides a signal to the control module. The signal, in combination with an electric timer providing time-related context for the movement, may serve as an additional indicator that the operator intends to activate the engine. In contemplated embodiments, the control module 830 includes a timer and is configured to deactivate the motor if the engine has not started within a predetermined amount of time. In some contemplated embodiments, the control module 830 includes a temperature sensor and is configured to prime the engine with an automated primer pump or adjust the choke or throttle plate if ambient temperature is above or below a predetermined temperature, if a portion of the engine is above or below a predetermined temperature, or if the difference between ambient and engine temperature is above or below a predetermined value. In contemplated embodiments, the control module 830 may also provide a signal output to the operator, such as a visible indicator on a display coupled to the handle or engine, or an audible alert. In some such embodiments, the signal output may include as an error message, a low-fuel message, a replace-oil message, or another such message.

Figure 14:
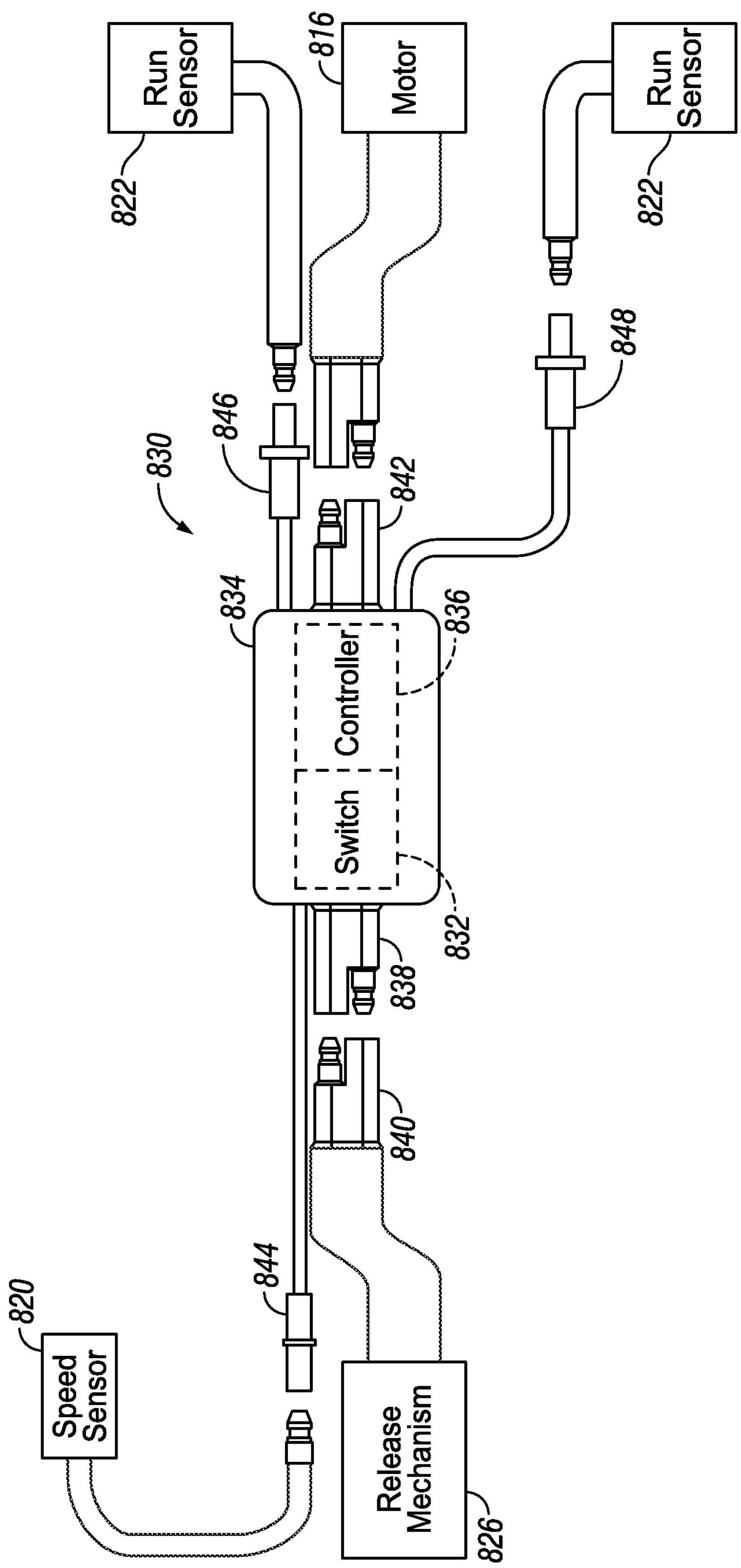
FIG. 14 is a front view of a control module of the outdoor power equipment of FIG. 13.

Referring now to FIG. 14, the control module 830 is illustrated according to an exemplary embodiment. The control module 830 includes a housing 834, a controller 836 configured to implement control logic for operation of the outdoor power equipment 810, a connector 838 configured to be electrically coupled to a release assembly wiring harness 840, and a connector 842 configured to be electrically coupled to the electric motor 816. The connectors 838 and 842 are located on opposite sides of the housing 834 to accommodate connecting the control module 830 inline with one or more wiring harnesses. The controller 836 is positioned within the housing 834. In some embodiments, the control module 830 includes a connector 844 configured to be electrically coupled to the speed sensor 820. The connector 844 is located on an opposite side of the housing 834 from one of the connectors 838 and 842. In some embodiments, the switch 832 is a component of the control module 830 and is positioned within the housing 834.

In some embodiments, the control module 830 also includes one or more connectors 846 and 848 configured to be electrically coupled to a run sensor 822 to provide inputs from the run sensor 822 to the controller 836. The run sensors 822 are considered to be connected in parallel to the control module 830. Alternatively, more than one run sensor 822 can be connected to a single connector 846 so that the controller 836 receives a single run sensor input, but only when all of the run sensors 822 are satisfied that the implement 814 is in the ready-to-run condition. In such an embodiment, the run sensors 822 are considered to be connected in series to the control module 830. In some embodiments, the input from the run sensor is provided via a wiring harness (e.g., the release assembly wiring harness 840), electrically coupled to connectors 838 or 842, so no separate connector for a run sensor is required to provide a run sensor input to the controller 836. Each connector 846 and 848 is located on an opposite side of the housing 834 from one of the connectors 838 and 842.

The controller 836 may include components configured to implement hard wired control logic or a processing circuit. The processing circuit can include a processor and memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to the processor via the processing circuit and includes computer code for executing (e.g., by processing circuit and/or processor) one or more processes described herein.

The release assembly wiring harness 840 electrically couples the electric motor 816, the run sensor 822, and the battery 828 together. For example, in the lawn mower example, the release assembly wiring harness is the bail wiring harness electrically connecting the release assembly including the release mechanism or bail 826 to the electric motor 816 and the motor 816. By connecting the connector 838 to the release assembly wiring harness 840 (e.g., the bail wiring harness of a lawn mower) and connecting the connector 842 to the electric motor 816, the control module 830 is electrically coupled to the release assembly wiring harness 840.

By connecting the control module 830 to exiting wiring, outdoor power equipment configured to be pull started (e.g., by a recoil starter) is converted to electric start. The control module 830 is easily connected inline with existing wiring, thereby eliminating the need for adding additional wiring or significantly rerouting wiring for an electric start outdoor power equipment model as compared to a pull start outdoor power equipment model. The control module 830 is relatively small in size and light weight. This allows the control module 830 to be connected to existing wiring and not physically mounted to any other component of the outdoor power equipment. That is, once connected to the existing wiring, the control module 830 is free to remain otherwise unsupported (e.g. dangle with the existing wiring harnesses) by a mount, bracket, or other physical support structure on the outdoor power equipment. The control module 830 allows a manufacturer to provide an outdoor power equipment product available as either a pull start model or an electric start model while simplifying the manufacturing process. The manufacturing process is simplified because the control module 830 that converts the outdoor power equipment to electric start is connected to existing components (i.e., the release assembly wiring harness 840 and the electric motor 816) of the pull start outdoor power equipment and does not require a separate physical mounting structure.

The construction and arrangements of the starter system for an engine, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An internal combustion engine, comprising:
- a cylinder;
- an exhaust;
- a fuel tank;
- an engine cover;
- a power take off configured to drive an implement;
- an electric starting system comprising:
  - a starter motor,
  - a battery receiving port, and
  - a rechargeable battery removably attached to the battery receiving port, wherein the rechargeable battery is configured to power the starter motor to start the engine; and
- an electric start control module comprising:
  - a switch configured to be actuated by a release mechanism configured to put the implement in the ready-to-run condition, wherein the switch is configured to provide a signal when the release mechanism is in an engaged position, and
  - a controller coupled to the switch to receive the signal, the controller configured to turn on the starter motor to start the internal combustion engine upon receipt of the signal from the switch and an input from a run sensor confirming that the implement is in the ready-to-run condition.

2. The internal combustion engine of claim 1, wherein the battery receiving port is integrated with the engine cover.

3. The internal combustion engine of claim 2, further comprising:
- a locking mechanism configured to hold the rechargeable battery in the battery receiving port.

4. The internal combustion engine of claim 3, wherein the locking mechanism is configured to be released by a user to allow removal of the rechargeable battery from the battery receiving port.

5. The internal combustion engine of claim 1, wherein the electric start control module further comprises:
- a housing,
- a first connector configured to electrically connect to a release mechanism wiring harness, and
- a second connector configured to electrically connect to the starter motor, wherein the first connector and the second connector are located on opposite sides of the housing.

6. The internal combustion engine of claim 1, further comprising:
- an engine speed sensor configured to detect when the internal combustion engine is running at a threshold speed, wherein the engine speed sensor is coupled to the control module, and wherein the control module turns off the starter motor when the engine speed sensor detects the threshold speed.

7. The internal combustion engine of claim 1, further comprising:
- a locking mechanism configured to hold the rechargeable battery in the battery receiving port.

8. The internal combustion engine of claim 7, wherein the locking mechanism is configured to be released by a user to allow removal of the rechargeable battery from the battery receiving port.

9. The internal combustion engine of claim 1, wherein the battery receiving port is integrated with the engine cover; and wherein the electric start control module further comprises:

a housing;

a first connector configured to electrically connect to a release mechanism wiring harness; and a second connector configured to electrically connect to the starter motor, wherein the first connector and the second connector are located on opposite sides of the housing.

10. The internal combustion engine of claim 1, further comprising:

an engine speed sensor configured to detect when the internal combustion engine is running at a threshold speed, wherein the engine speed sensor is coupled to the control module, wherein the control module turns off the starter motor when the engine speed sensor detects the threshold speed, and wherein the battery receiving port is integrated with the engine cover.

11. The internal combustion engine of claim 1, further comprising:

an engine speed sensor configured to detect when the internal combustion engine is running at a threshold speed, wherein the engine speed sensor is coupled to the control module, and wherein the control module turns off the starter motor when the engine speed sensor detects the threshold speed; and wherein the electric start control module further comprises:

a housing, a first connector configured to electrically connect to a release mechanism wiring harness, and a second connector configured to electrically connect to the starter motor, wherein the first connector and the second connector are located on opposite sides of the housing.

12. The internal combustion engine of claim 1, further comprising:

a locking mechanism configured to hold the rechargeable battery in the battery receiving port; and wherein the electric start control module further comprises:

a housing, a first connector configured to electrically connect to a release mechanism wiring harness, and a second connector configured to electrically connect to the starter motor, wherein the first connector and the second connector are located on opposite sides of the housing.

13. The internal combustion engine of claim 1, further comprising:

a locking mechanism configured to hold the rechargeable battery in the battery receiving port, wherein the locking mechanism is configured to be released by a user to allow removal of the rechargeable battery from the battery receiving port; and wherein the electric start control module further comprises:

a housing, a first connector configured to electrically connect to a release mechanism wiring harness, and a second connector configured to electrically connect to the starter motor, wherein the first connector and the second connector are located on opposite sides of the housing.

14. The internal combustion engine of claim 1, further comprising a locking mechanism configured to hold the rechargeable battery in the battery receiving port, wherein the battery receiving port is integrated with the engine cover; and wherein the electric start control module further comprises:

a housing;

a first connector configured to electrically connect to a release mechanism wiring harness; and a second connector configured to electrically connect to the starter motor, wherein the first connector and the second connector are located on opposite sides of the housing.

15. The internal combustion engine of claim 1, further comprising:

an engine speed sensor configured to detect when the internal combustion engine is running at a threshold speed, wherein the engine speed sensor is coupled to the control module, and wherein the control module turns off the starter motor when the engine speed sensor detects the threshold speed; and a locking mechanism configured to hold the rechargeable battery in the battery receiving port, wherein the battery receiving port is integrated with the engine cover.

16. The internal combustion engine of claim 1, further comprising a locking mechanism configured to hold the rechargeable battery in the battery receiving port, wherein the battery receiving port is integrated with the engine cover, wherein the locking mechanism is configured to be released by a user to allow removal of the rechargeable battery from the battery receiving port; and wherein the electric start control module further comprises:

a housing;

a first connector configured to electrically connect to a release mechanism wiring harness; and a second connector configured to electrically connect to the starter motor, wherein the first connector and the second connector are located on opposite sides of the housing.

17. The internal combustion engine of claim 1, further comprising:

an engine speed sensor configured to detect when the internal combustion engine is running at a threshold speed, wherein the engine speed sensor is coupled to the control module, and wherein the control module turns off the starter motor when the engine speed sensor detects the threshold speed; and a locking mechanism configured to hold the rechargeable battery in the battery receiving port, wherein the battery receiving port is integrated with the engine cover, wherein the locking mechanism is configured to be released by a user to allow removal of the rechargeable battery from the battery receiving port.

18. The internal combustion engine of claim 1, further comprising:

an engine speed sensor configured to detect when the internal combustion engine is running at a threshold speed, wherein the engine speed sensor is coupled to the control module, and wherein the control module turns off the starter motor when the engine speed sensor detects the threshold speed; and a locking mechanism configured to hold the rechargeable battery in the battery receiving port.

19. The internal combustion engine of claim 1, further comprising:

an engine speed sensor configured to detect when the internal combustion engine is running at a threshold speed, wherein the engine speed sensor is coupled to the control module, and wherein the control module turns off the starter motor when the engine speed sensor detects the threshold speed; and a locking mechanism configured to hold the rechargeable battery in the battery receiving port, wherein the locking mechanism is configured to be released by a user to allow removal of the rechargeable battery from the battery receiving port.

20. The internal combustion engine of claim 1, further comprising:

an engine speed sensor configured to detect when the internal combustion engine is running at a threshold speed, wherein the engine speed sensor is coupled to the control module, and wherein the control module turns off the starter motor when the engine speed sensor detects the threshold speed;

a locking mechanism configured to hold the rechargeable battery in the battery receiving port; and wherein the electric start control module further comprises:

a housing, a first connector configured to electrically connect to a release mechanism wiring harness, and a second connector configured to electrically connect to the starter motor, wherein the first connector and the second connector are located on opposite sides of the housing.

* * * * *